United States Patent
Pantalone et al.

(10) Patent No.: US 7,548,814 B2
(45) Date of Patent: Jun. 16, 2009

(54) DISPLAY BASED ON LOCATION INFORMATION

(75) Inventors: Brett Anthony Pantalone, Pittsboro, NC (US); Magnus Jendbro, Staffanstorp (SE); William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 530 days.

(21) Appl. No.: 11/388,978

(22) Filed: Mar. 27, 2006

(65) Prior Publication Data

US 2007/0225904 A1    Sep. 27, 2007

(51) Int. Cl.
*G06F 15/00* (2006.01)

(52) U.S. Cl. ........................ 701/212; 382/276

(58) Field of Classification Search ............... 701/212, 701/208; 345/663, 665, 662; 382/276, 279, 382/298; 340/990, 995.14, 995.15
See application file for complete search history.

(56) References Cited

U.S. PATENT DOCUMENTS 5,793,310 A * 8/1998 Watanabe et al. ...... 340/995.14

6,282,490 B1   8/2001 Nimura et al.
6,445,999 B1 * 9/2002 Nakamura ................. 701/208
6,573,842 B2 * 6/2003 Mochizuki et al. ..... 340/995.14

FOREIGN PATENT DOCUMENTS

| EP | 0 793 074 A1 | 9/1997 |
| EP | 1 014 038 A1 | 6/2000 |
| EP | 1 288 627 A2 | 3/2003 |
| JP | 6-273184 (A) | 9/1994 |
| JP | 9-197961 (A) | 7/1997 |
| JP | 2000-352927 (A) | 12/2000 |

OTHER PUBLICATIONS

International Search Report and Written Opinion dated Mar. 21, 2007, issued in corresponding PCT Application No. PCT/IB2006/002672.
L. Harrie et al., "A Variable-Scale Map for Small-Display Cartography", XP-002422453, 6 pages, date is not available.

* cited by examiner

*Primary Examiner*—Dalena Tran
(74) *Attorney, Agent, or Firm*—Harrity & Harrity, LLP

(57) ABSTRACT

A method may include obtaining location information associated with a device, determining a focal point for a map based on the location information, displaying the focal point on the map, and decreasing a detail or a scale on the map as a radial distance from the focal point increases.

28 Claims, 9 Drawing Sheets

DISPLAY BASED ON LOCATION INFORMATION

BACKGROUND

1. Field of the Invention

Implementations described herein relate generally to devices and, more particularly, to displays for devices based on location information.

2. Description of Related Art

Small displays on mobile communication devices present problems when they attempt to convey large amounts of information within their confines. For example, a map showing the location of a user of a mobile communication device may be displayed to aid the user with navigation (e.g., when walking or driving around an unknown location). A user may wish to zoom out from his/her location on the map in order to obtain some context as to where the user is located in a larger area. However, when a user zooms out from his/her location on the map, the map on the mobile communication device does not provide enough detail (due to the size of the display) to aid a user with navigation. Likewise, when a user zooms in on his/her location on the map, the map may fail to provide enough context as to where the user is located in a larger area, further hindering navigation.

SUMMARY

According to one aspect, a method may comprise obtaining location information associated with a device, determining a focal point for a map based on the location information, displaying the focal point on the map, and decreasing a detail or a scale on the map as a radial distance from the focal point increases.

Additionally, the method may further comprise displaying the focal point at a center of the map.

Additionally, the method may further comprise adjusting the focal point to a location on the map other than a center of the map.

Additionally, the method may further comprise adjusting the focal point to a point on the map based on an orientation of the device.

Additionally, the method may further comprise adjusting the focal point to a point on the map based on a velocity of the device.

Additionally, the method may further comprise adjusting the focal point to a point on the map based on a user inputted location.

Additionally, the method may decrease the detail or the scale on the map continuously, in discrete steps, logarithmically, or exponentially, as the radial distance from the focal point increases.

Additionally, the method may further comprise displaying a direction to a point of interest outside a viewing area of the map.

Additionally, the method may further comprise determining the focal point for the map based on a location of the device as determined through a global position system (GPS).

Additionally, the method may further comprise determining a field of view for the map based on an orientation of the device.

Additionally, the method may further comprise determining the focal point for the map based on user input.

Additionally, the method may further comprise determining a field of view for the map based on a velocity of the device.

Additionally, the method may further comprise adjusting a feature of the map based on a user controlled map scaling.

According to another aspect, a device may comprise means for obtaining location information associated with the device, means for determining a focal point for a map based on the location information, and means for displaying the map. A device may also comprise means for displaying the focal point on the map, and means for decreasing a detail or a scale on the map as a radial distance from the focal point increases.

Additionally, the device may further comprise means for displaying the focal point at a center of the map.

Additionally, the device may further comprise means for displaying the focal point at a location on the map other than a center of the map.

According to yet another aspect, a device may comprise a location information gatherer to obtain location information associated with the device, and processing logic to determine a focal point for a map based on the location information, display the map, display the focal point on the map, and decrease a detail or a scale on the map as a radial distance from the focal point increases.

Additionally, the location information gatherer may include at least one of a global positioning system (GPS) unit to determine a location or a velocity of the device, a compass to determine an orientation of the device, or a Doppler unit to determine the velocity of the device.

Additionally, the processing logic may be configured to determine the focal point based on the location received from the GPS unit.

Additionally, the processing logic may be configured to determine a field of view for the map based on the orientation received from the compass.

Additionally, the processing logic may be configured to determine a field of view for the map based on the velocity received from one of the GPS unit or the Doppler unit.

Additionally, the processing logic may be configured to adjust the focal point to a point on the map based on the orientation received from the compass.

Additionally, the processing logic may be configured to adjust the focal point to a point on the map based on the velocity received from the Doppler unit.

Additionally, the processing logic may be configured to adjust the focal point to a point on the map based on a user inputted location.

Additionally, the processing logic may be configured to determine the focal point based on a user inputted location.

Additionally, the processing logic may be configured to display the focal point at a center of the map.

Additionally, the processing logic may be configured to display the focal point at a location on the map other than a center of the map.

Additionally, the processing logic may be configured to one of continuously, discretely, logarithmically, or exponentially decrease a detail or a scale on the map as a radial distance from the focal point increases.

According to a further aspect, a device may comprise a memory to store instructions, and a processor to execute the instructions to determine a focal point for a map based on the location information, display the map, display the focal point on the map, and decrease a detail or a scale on the map as a radial distance from the focal point increases.

According to still another aspect, a method may comprise presenting a map for display on a device, and decreasing a detail or a scale on the map as a radial distance from a location on the map increases.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

Figure 1:
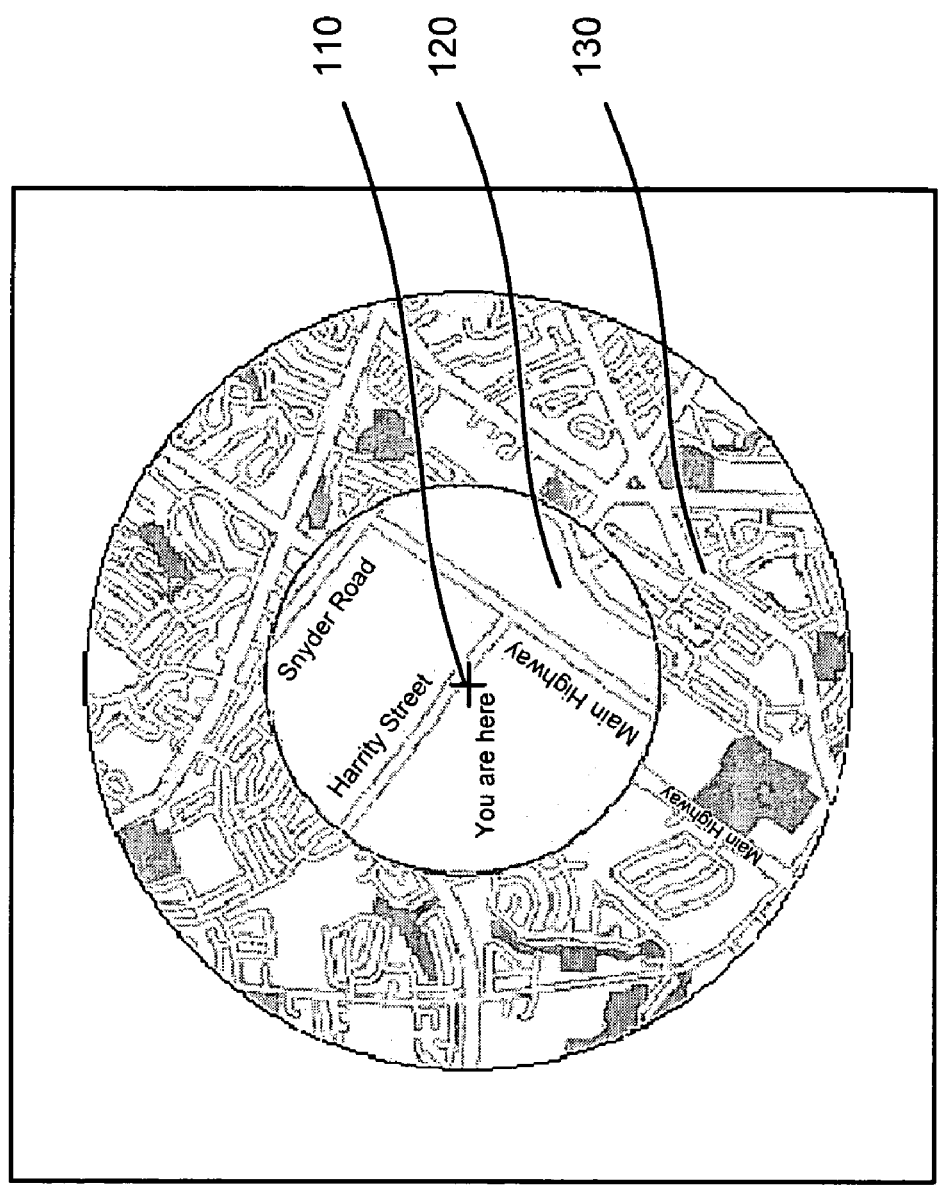
FIG. 1 is an exemplary diagram illustrating concepts consistent with the principles of the invention.

The following detailed description of the invention refers to the accompanying drawings. The same reference numbers in different drawings may identify the same or similar elements. Also, the following detailed description does not limit the invention.

Implementations consistent with the principles of the invention may relate to the displaying of maps based on location information. By using location information (e.g., the location of a device and the direction the device is oriented), maps having variable details and/or scales may be displayed on the device. For example, the location of the device may be determined through a global position system (GPS) receiver in the device. A focal point may be inserted at the center of a device display and/or at the center of a map provided on the display of the device. The focal point may indicate the location of the device on the map.

Once the focal point is set, the scale of the map may be adjusted based on the focal point. For example, the details of the map may decrease as a radial distance from the focal point increases. That is, the scale of the map near the focal point (e.g., one centimeter on the map may equal ten meters (1,000 centimeters) on the earth, a 1:1,000 scale) may be larger than the scale of the map further away from the focal point (e.g., one centimeter on the map may equal one-thousand meters (100,000 centimeters) on the earth, a 1:100,000 scale).

The term "scale" as used herein may be defined as the relationship between the distance on the map and the distance on the ground (earth). A map scale may be given as a fraction or a ratio (e.g., 1:10). A representative fraction scale (e.g., 1:10,000) may mean that one unit of measurement on the map (e.g., one centimeter) may represent 10,000 of the same units (e.g., 10,000 centimeters) on the ground. The first number (map distance) may be one. The second number (ground distance) may be different for each scale. The larger the second number (ground distance) may be, the smaller the scale of the map may be. A large scale map (e.g., a 1:1,000 scale) may show a small area with a large amount of detail. A small scale map (e.g., a 1:100,000 scale) may show a large area with a small amount of detail.

Such an arrangement may display a map that may provide a large amount of detail of the immediate surroundings of the device, and may provide a context of the surroundings (but not as many details) further away from the device.

The description to follow will describe a device. As used herein, a "device" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, a Doppler receiver, and/or global positioning system (GPS) receiver; a laptop; a GPS device; and any other computation or communication device capable of displaying a map, such as a personal computer.

The description to follow will describe a map. As used herein, a "map" may include a representation of the whole and/or a part of an area; a topographic map; a planimetric map; a topological map; a thematic map; a satellite map; an infrared map, a hybrid map (e.g., a combination of other types of maps); and/or any of the map types available on the Internet, such as maps provided by MapQuest, Google, Yahoo, etc.

FIG. 1 is an exemplary diagram illustrating concepts consistent with the principles of the invention. As shown in FIG. 1, a display of a device may display a map 100. The features of map 100 may be based on location information (e.g., the position, orientation, velocity, etc. of the device). The location of the device may be determined through a global position system (GPS) receiver that may be provided in the device. A focal point based on the location of the device may be provided on map 100. For example, a focal point 110 may be provided at a center of map 100 and may identify the location of the device on map 100 (e.g., near the corner of Harrity Street and Main Highway). The details and/or scale of map 100 may decrease as the radial distance from focal point 110 increases. For example, as shown in FIG. 1, a scale of map 100 in a region 120 closer to focal point 110 may be larger than a scale of map 100 in a region 130 further away from focal point 110. Thus, region 120 may display more details (e.g., names of streets, points of interest, etc.) on map 100 than region 130.

Exemplary Device Architecture

Figure 2:
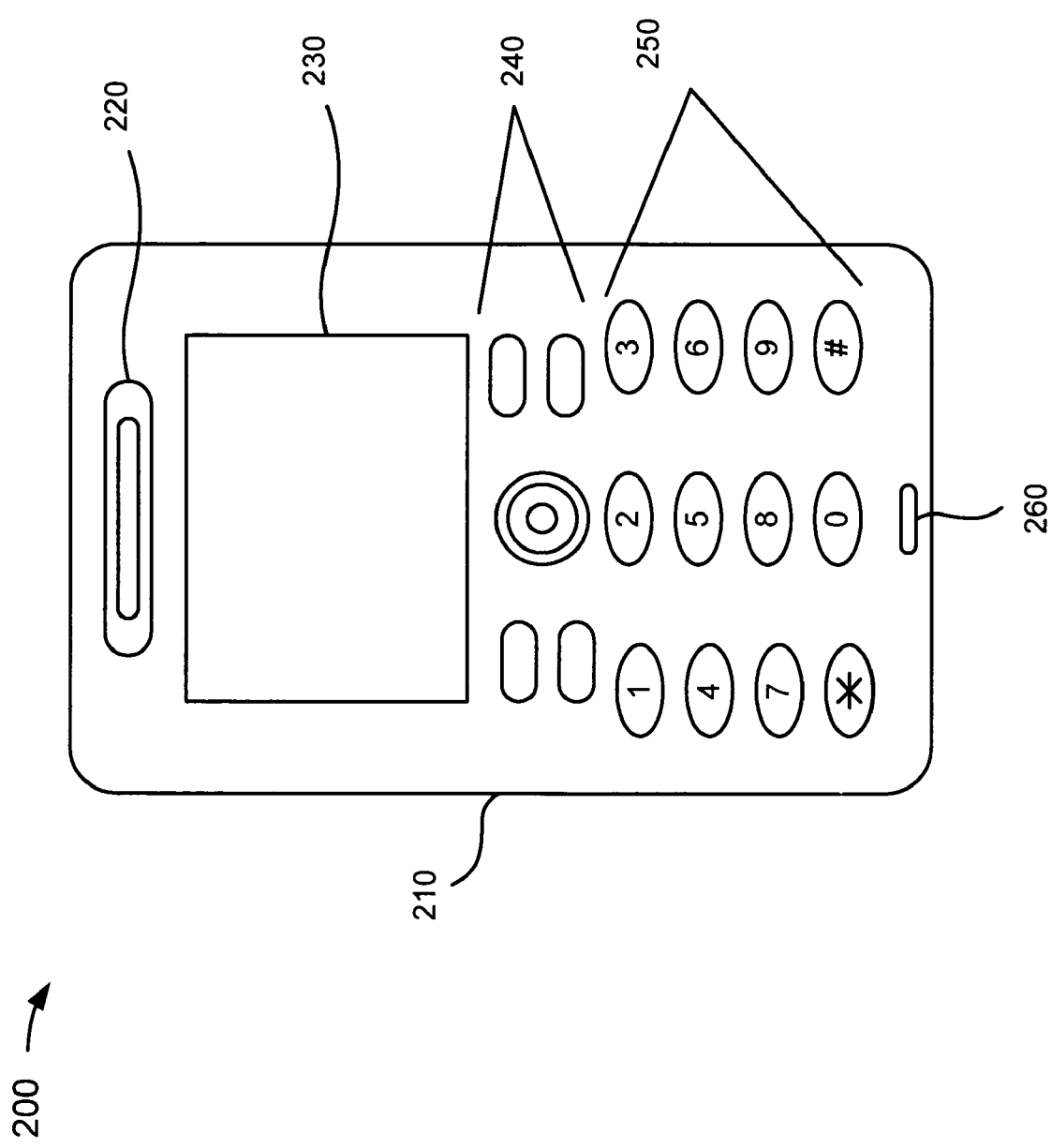
FIG. 2 is a diagram of an exemplary device in which systems and methods consistent with the principles of the invention may be implemented.

FIG. 2 is a diagram of an exemplary device 200 according to an implementation consistent with the principles of the invention. As shown in FIG. 2, device 200 may include a housing 210, a speaker 220, a display 230, control buttons 240, a keypad 250, and a microphone 260. Housing 210 may protect the components of device 200 from outside elements. Speaker 220 may provide audible information to a user of device 200. Display 230 may provide visual information to the user. For example, display 230 may provide information regarding incoming or outgoing calls, games, phone books, the current time, etc. In an implementation consistent with the principles of the invention, display 230 may provide the user with location information in the form of a map having adjustable scales. Control buttons 240 may permit the user to interact with device 200 to cause device 200 to perform one or more operations. Keypad 250 may include a standard telephone keypad. Microphone 260 may receive audible information from the user.

Figure 3:
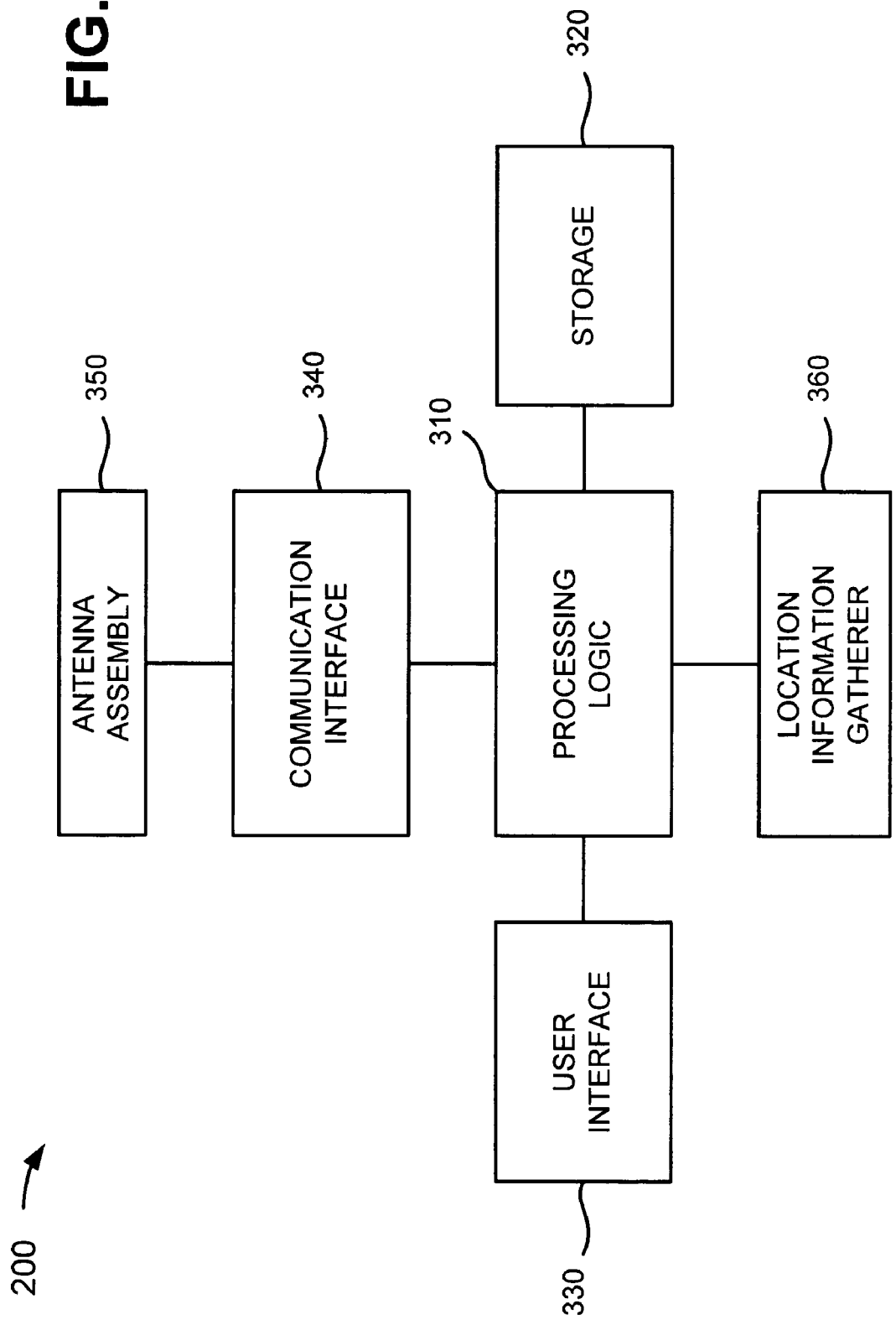
FIG. 3 is a diagram of exemplary components of the exemplary device of FIG. 2.

FIG. 3 is a diagram of exemplary components of device 200. As shown in FIG. 3, device 200 may include processing logic 310, storage 320, user interface 330, communication interface 340, antenna assembly 350, and location information gatherer 360. Processing logic 310 may include a processor, microprocessor, an application specific integrated circuit (ASIC), field programmable gate array (FPGA), or the like. Processing logic 310 may include data structures or software programs to control operation of device 200 and its components. Storage 320 may include a random access memory (RAM), a read only memory (ROM), and/or another type of memory to store data and instructions that may be used by processing logic 310.

User interface 330 may include mechanisms for inputting information to device 200 and/or for outputting information from device 200. Examples of input and output mechanisms might include a speaker (e.g., speaker 220) to receive electrical signals and output audio signals, a microphone (e.g., microphone 260) to receive audio signals and output electrical signals, buttons (e.g., a joystick, control buttons 240 and/or keys of keypad 250) to permit data and control commands to be input into device 200, a display (e.g., display 230) to output visual information, and/or a vibrator to cause device 200 to vibrate.

Communication interface 340 may include, for example, a transmitter that may convert baseband signals from processing logic 310 to radio frequency (RF) signals and/or a receiver that may convert RF signals to baseband signals. Alternatively, communication interface 340 may include a transceiver to perform functions of both a transmitter and a receiver. Communication interface 340 may connect to antenna assembly 350 for transmission and reception of the RF signals. Antenna assembly 350 may include one or more antennas to transmit and receive RF signals over the air. Antenna assembly 350 may receive RF signals from communication interface 340 and transmit them over the air and receive RF signals over the air and provide them to communication interface 340.

Location information gatherer 360 may obtain location information from device 200. In one implementation, the location information may correspond to the location and orientation of device 200. In this case, location information gatherer 360 may include global positioning system (GPS) technology to determine the location and/or orientation (e.g., device 200 is oriented to point to a Northeast compass direction) of device 200. In another implementation, the location information may correspond to a user inputted location. In this case, location information gatherer 360 may include a keyboard or another type of input buttons (e.g., control buttons 240 and/or keys of keypad 250) that permits the user to enter information regarding a location (e.g., the address of a destination to be traveled to by the user). In yet another implementation, the location information may correspond to the velocity of device 200 (e.g., the user of device 200 is walking or driving). In this case, location information gatherer 360 may include a mechanism (e.g., antenna assembly 350 may receive Doppler signals and/or GPS signals) that permits calculation of the velocity of device 200 (and/or the user).

As will be described in detail below, device 200, consistent with the principles of the invention, may perform certain operations relating to the providing of displays based on location information. Device 200 may perform these operations in response to processing logic 310 executing software instructions of a mapping application contained in a computer-readable medium, such as storage 320. A computer-readable medium may be defined as a physical or logical memory device and/or carrier wave.

The software instructions may be read into storage 320 from another computer-readable medium or from another device via communication interface 340. The software instructions contained in storage 320 may cause processing logic 310 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Display Methods

FIGS. 4-7 are diagrams of exemplary display methods according to implementations consistent with the principles of the invention. The display methods of FIGS. 4-7 may be conveyed on device 200 (e.g., on display 230 of device 200).

Figure 4:
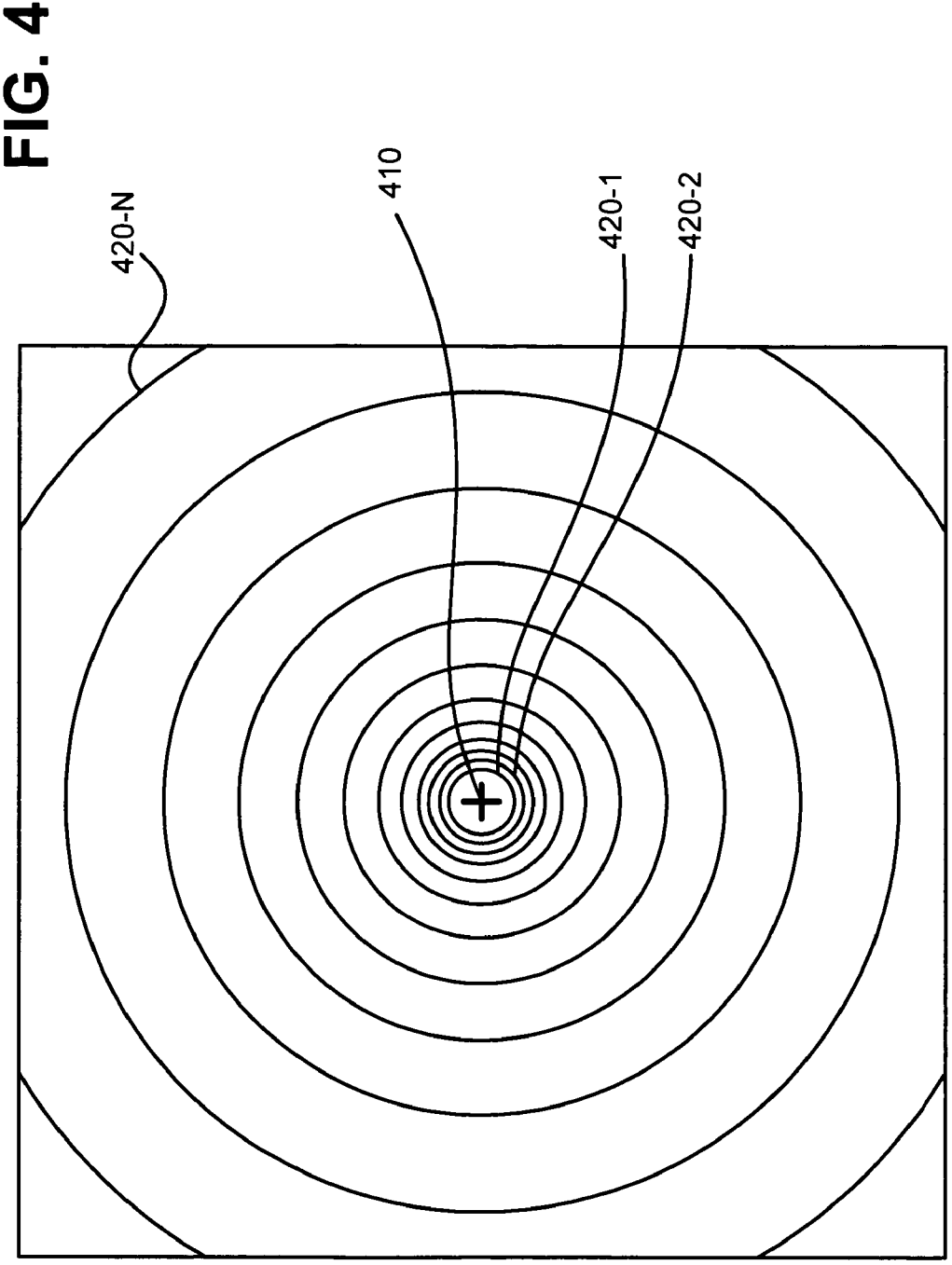
FIGS. 4-7 are diagrams of exemplary display methods according to implementations consistent with the principles of the invention.

As shown in FIG. 4, a display of a device (e.g., display 230 of device 200) may display a map 400. The features of map 400 may be based on location information (e.g., the position, orientation, velocity, etc. of device 200). The location of device 200 may be determined through a global position system (GPS) receiver (e.g., communication interface 340 of device 200). A focal point based on the location of device 200 may be provided on map 400. For example, a focal point 410 may be provided at the center of map 400 and may identify the location of device 200 on map 400. The details and/or scale of map 400 may decrease as the radial distance from focal point 410 increases. For example, the details of map 400 may be greater at a concentric circle 420-1 (which may have the closest radial distance from focal point 410), than at a concentric circle 420-2. The details and/or scale of map 400 may decrease moving along concentric circles 420-1, 420-2, . . . , 420-N of map 400. The details of map 400 may be the greatest at concentric circle 420-1, and may be the least at concentric circle 420-N. The scale of map 400 may be the largest at concentric circle 420-1, and may be the smallest at concentric circle 420-N.

There are number of ways that the details and/or scale of map 400 may be decreased so that details may be provided at a location on map 400 closest to focal point 410 and/or context may be provided at a location on map 400 furthest from focal point 410. For example, in one implementation, the details and/or scale of map 400 may be decreased continuously as the radial distance from focal point 410 increases. In another implementation, the details and/or scale of map 400 may be decreased in discrete steps as the radial distance from focal point 410 increases. In still another implementation, the details and/or scale of map 400 may decrease logarithmically as the radial distance from focal point 410 increases. A logarithmic decrease of details and/or scale may cause a rapid decrease in details and/or scale at a predetermined radius from focal point 410, and may cause nearly constant details and/or scale past the predetermined radius. In a further implementation, the details and/or scale of map 400 may decrease exponentially as the radial distance from focal point 410 increases, which may cause the details and/or scale of map 400 to decrease rapidly with radius.

In still a further implementation, map 400 may include a continuously changing scale (e.g., based on the radial distance from focal point 410) such that it may be easier for a user viewing map 400 to follow features (e.g., roads) from regions of high scale to regions of smaller scale, and vice versa, on map 400. Such a continuously changing map scale may be implemented with enough sufficiently small discrete steps so that the changing map scale may not be visible on map 400.

In an implementation consistent with the principles of the invention, any of the above-mentioned decreasing methods may be set as a default by device 200. A user of device 200 may select the default and/or may change the default as desired.

Although focal point 410 of FIG. 4 may be automatically determined based on the location of device 200 as determined by a global position system (GPS) receiver (e.g., communication interface 340 of device 200), focal point 410 may, in an alternative implementation, be inputted by a user of device 200. For example, a user may input the focal point (e.g., the address of a destination to be traveled to by the user) with a keyboard or another type of input buttons (e.g., control buttons 240 and/or keys of keypad 250).

Figure 5:
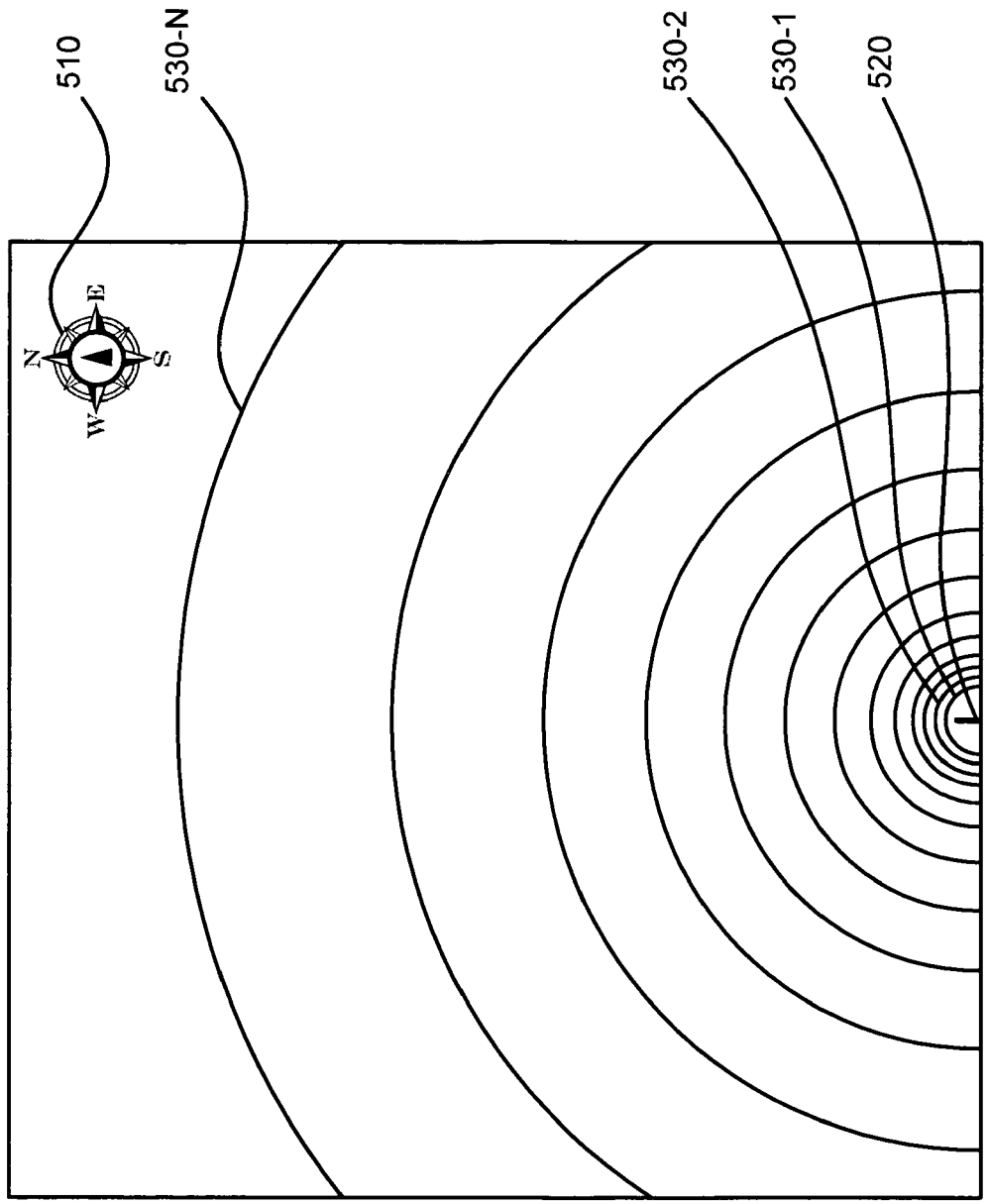

Although FIG. 4 shows focal point 410 being generated at the center of map 400, focal point 410 may be provided at any other location of map 400. For example, as shown in FIG. 5, a compass 510 may be provided in device 200 may be used to determine the orientation of device 200. A focal point 520 of a map 500 may shift to a portion of map 500 (e.g., the bottom of map 500) that opposes the orientation of device 200. In other words, the orientation of device 200 may be used to determine a field of view of map 500. As used herein, a "field of view" may include the portion of map 500 that may be seen at any given moment, such as, for example, a one-hundred and eighty degree (or any other angle of view between zero and three-hundred and sixty degrees) forward-facing field of view extending away from a portion (e.g., focal point 520) of map 500. Map 500 may display a current location of the user (e.g., focal point 520), as determined by a GPS receiver (e.g., communication interface 340 of device 200), and the field of view of map 500 may extend from focal point 520 towards the orientation of device 200. For example, device 200 may be oriented toward the north, as shown by compass 510 of FIG. 5. In this instance, focal point 520 may be provided at the furthest southern portion of map 500 (e.g., the bottom of map 500), and the field of view of map 500 may extend northward, eastward, and westward from focal point 520, as shown in FIG. 5. Compass 510 may be provided at any orientation on map 500 (e.g., the north direction may point to the top, bottom, right, left, or any angle in between on map 500).

In one implementation, the compass-determined direction of the field of view for map 500 may be combined with the map scaling methods described above in connection with FIG. 4. For example, the details and/or scale of map 500 may decrease in the radial direction away from focal point 520. The details and/or scale of map 500 may decrease moving along concentric circles 530-1, 530-2, ..., 530-N of map 500. The details of map 500 may be the greatest at concentric circle 530-1, and may be the least at concentric circle 530-N. The scale of map 500 may be the largest at concentric circle 530-1, and may be the smallest at concentric circle 530-N.

In another implementation, the compass-determined direction of the field of view may be provided for map 500, but map 500 may not utilize the map scaling methods described above in connection with FIG. 4.

As discussed above in connection with FIGS. 1, 4, and 5, the details of a map may decrease in the radial direction away from the focal point of the map. "Details" of a map, as that term is used herein, may include a variety of features, such as features provided on a large scale map (e.g., a street scale of a Yahoo map), such as roads (including secondary roads and side streets), landmarks, structures, parks, rivers, lakes, airports, railroads, campgrounds, mountains, bridges, etc.; and/or features provided on a small scale map (e.g., a city or state scale of a Yahoo map), such as boundaries (city, county, or state lines), parks, airports, major roads (e.g., interstate highways), railroads, etc.

Figure 6:
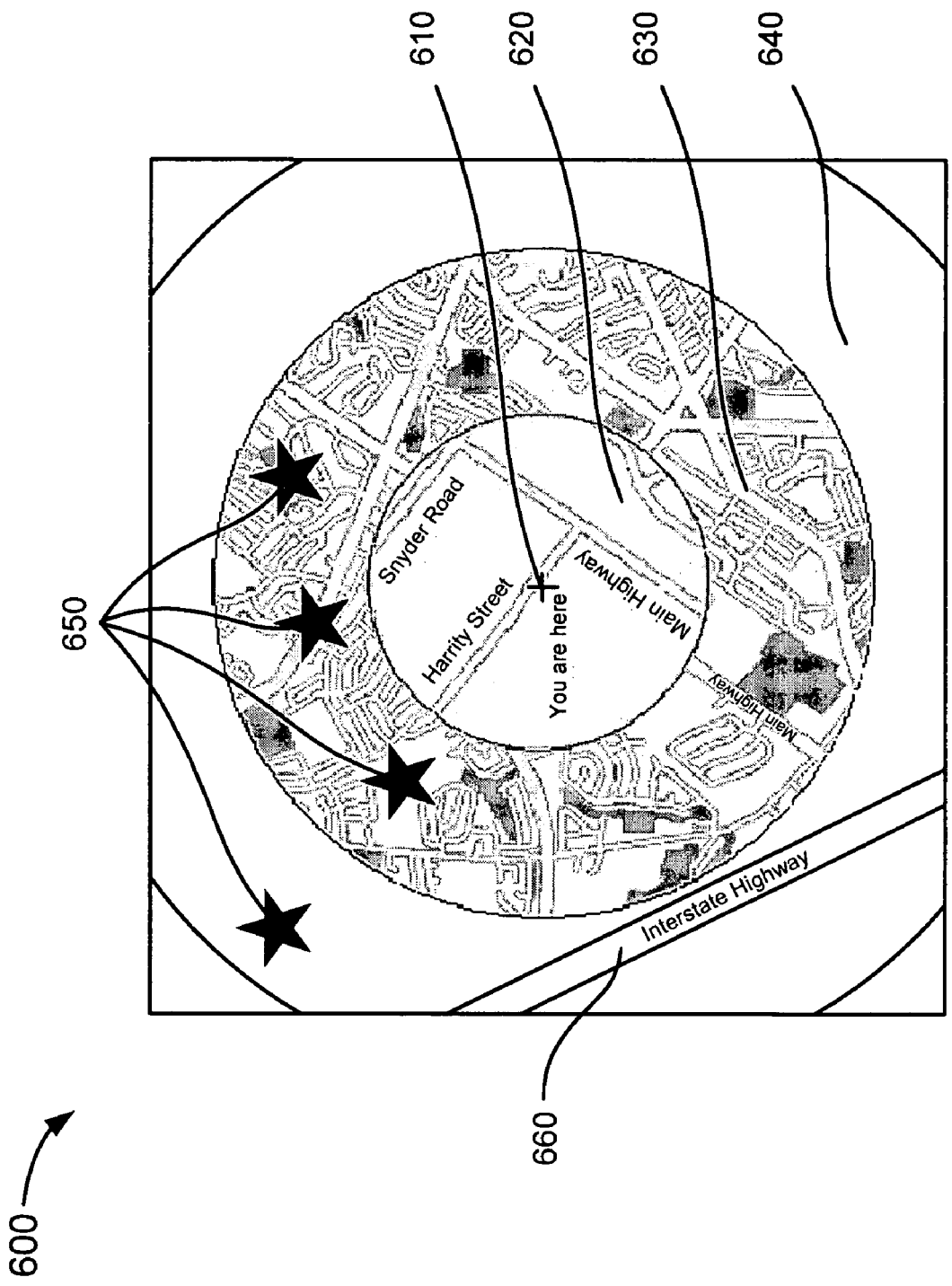

As shown in FIG. 6, the details of a map 600 may decrease as the radial distance from a focal point 610 of map 600 increases. Focal point 610 may be generated automatically as discussed above in connection with FIGS. 1 and 4, and/or manually by a user. Focal point 610 may be provided at the center of map 600 and may identify the location of device 200 on map 600 (e.g., near the corner of Harrity Street and Main Highway near the title "You are here").

According to an implementation consistent with the principles of the invention, the details and/or scale of map 600 may decrease as the radial distance from focal point 610 increases. For example, as shown in FIG. 6, a scale of map 600 in a region 620 closer to focal point 610 may be larger than a scale of map 600 in a region 630 further away from focal point 610. Thus, region 620 may display more details (e.g., more side streets and names of streets, points of interest, etc.) on map 600 than region 630 (e.g., region 630 may provide names for only larger streets, e.g. "Main Street"). A scale of map 600 in a region 640 farthest away from focal point 610 may be smaller than the scale of map 600 in regions 620 and 630. For example, region 630 may show smaller streets and several points of interest 650 (e.g., landmarks, important buildings, parks, etc.), whereas region 640 may show only larger roads (e.g., interstate highways) and may filter points of interest 650 (e.g., only one point of interest is shown in region 640).

Figure 7:
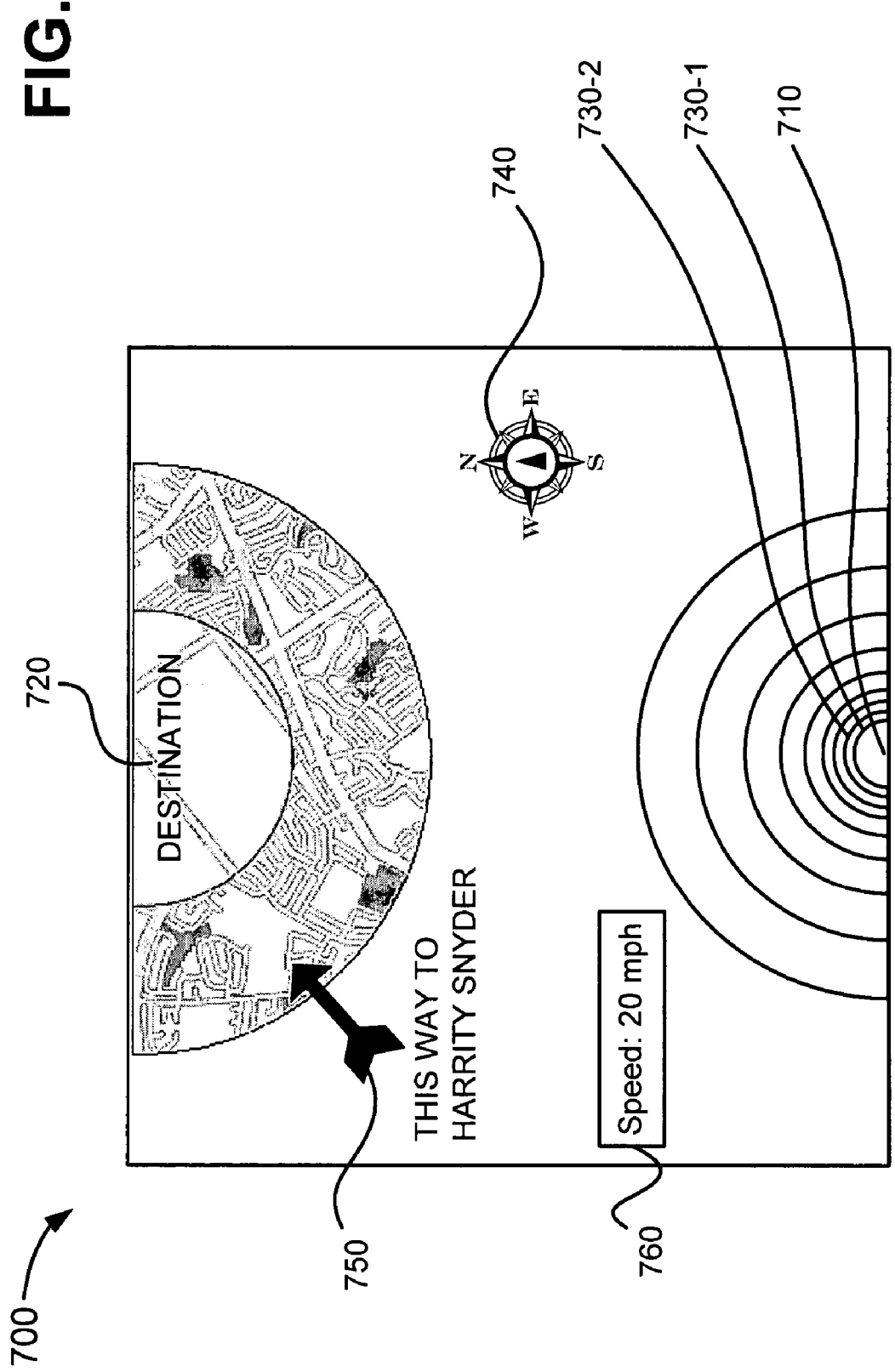

Although FIGS. 1 and 4-6 show only a single focal point on a map, more than one focal point may be provided on a map. For example, as shown in FIG. 7, a map 700 may include a first focal point 710 (e.g., indicating the location of device 200), and a second focal point 720 (e.g., indicating a user inputted destination to be reached). Focal points 710 and 720 may be generated automatically as discussed above in connection with FIGS. 1 and 4, and/or manually by a user. Focal points 710 and 720 may be generated based on a direction indicated by a compass 740, as discussed above in connection with FIG. 5. The compass-determined focal points (e.g., focal points 710 and 720) may be combined with the decreasing methods described above in connection with FIG. 4. The details and/or scale of map 700 may decrease as the radial distance from focal points 710 and 720 increases. For example, the details of map 500 may be greater at a concentric circle 730-1 (which may have the closest radial distance from focal point 710), than at a concentric circle 730-2.

In one implementation consistent with the principles of the invention and as shown in FIG. 7, points of interest outside of the viewing area of map 700 may be indicated by a visual feature on map 700 (e.g., by an arrow 750). For example, arrow 750 may indicate the direction to a point of interest (e.g., "Harrity Snyder") outside the viewing area of map 700.

In another implementation consistent with the principles of the invention and as shown in FIG. 7, the focal point of a map may be adjusted based on a velocity 760 of device 200. For example, as shown in FIG. 7, velocity 760 of device 200 may cause first focal point 710 on map 700 to shift to the bottom of map 700 so that map 700 may display a current location of the user (e.g., first focal point 710) and map details extending from the current location to the horizon in the direction of velocity 760 of device 200. In other words, velocity 760 of device 200 may be used to determine the field of view of map 700, according to an implementation consistent with the principles of the invention as discussed above in connection with FIG. 5. Velocity 760 of device 200 may be determined through a Doppler receiver and/or a GPS receiver (e.g., communication interface 340 of device 200). Velocity 760 may be displayed on map 760 as shown in FIG. 7.

In one implementation, the details and/or scale of map 700 may be adjusted based on velocity 760. For example, first focal point 710 may move toward the center of map 700 as velocity 760 of device 200 decreases. The details and/or scale of map 700 may be adjusted accordingly as first focal point 710 moves toward the center of map 700. Velocity 760 may be used to flip map 700 vertically if device 200 is improperly oriented (e.g., a user has device 200 upside down). For example, if a user has device 200 upside down and is moving (e.g., driving or walking) in a direction opposite to the direction the top of device display 230 is pointing, then velocity 760 may be used to flip map 700 vertically. In such a case, first focal point 710 may be provided at what is the top of device display 230 and second focal point 720 may be provided at what is the bottom of device display 230.

In an implementation consistent with the principles of the present invention, a user of device 200 may control how a map is displayed on device 200. For example, device 200 may include a user controlled map scaling mechanism (e.g., control buttons 240 and/or keys of keypad 250) that may permit a user to zoom in and out of any portion of a map. User controlled zoom functions may be utilized with any of the display methods discussed above in connection with FIGS. 4-7.

Exemplary Processing

Figure 8:
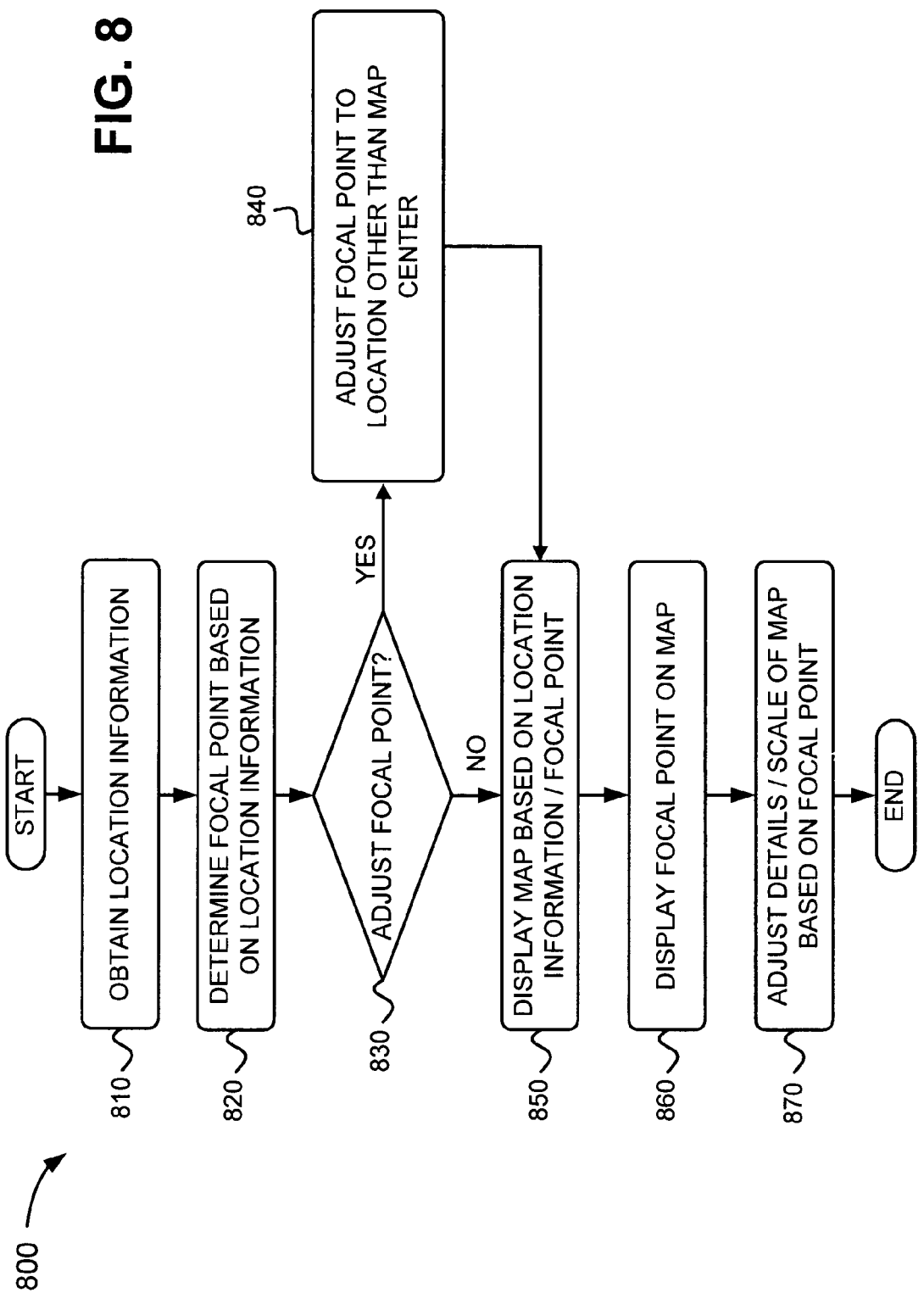
FIGS. 8 and 9 are flowcharts of exemplary processes according to implementations consistent with the principles of the invention.
Figure 9:
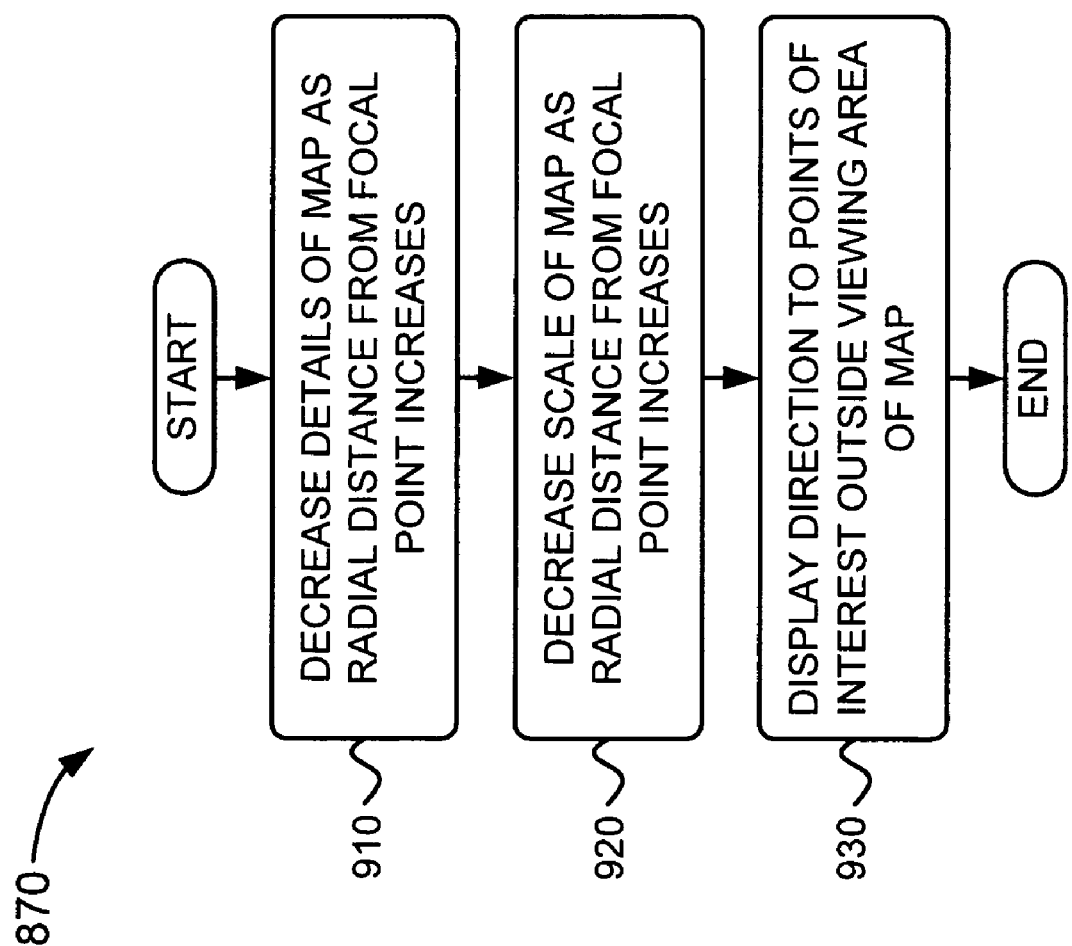

FIGS. 8 and 9 are flowcharts of exemplary processes according to implementations consistent with the principles of the invention. As shown in FIG. 8, a display process 800 may begin by obtaining location information (block 810). For example, location information gatherer 360 of device 200 may obtain location information (e.g., position, orientation, velocity, etc. of device 200) from one or more sources, such as a global position system (GPS) receiver (e.g., communication interface 340 of device 200), a compass, a Doppler receiver (e.g., communication interface 340 of device 200), and/or user input (e.g., a user inputted destination).

A focal point may be determined based on the location information (block 820). For example, in one implementation as discussed above in connection with FIG. 4, a focal point based on the location of device 200 may be provided on map 400, e.g., focal point 410 may be provided at the center of map 400 and may identify the location of device 200 on map 400.

If the focal point is to be adjusted (block 830—YES), then the focal point may be adjusted to another location other than the center of the map (block 840). For example, in one implementation as discussed above in connection with FIG. 5, compass 510 may cause focal point 520 of map 500 to shift to the bottom of map 500. Map 500 may display a current location of the user (e.g., focal point 520) and map details or features extending from the current location to the horizon in the direction compass 510 (i.e., device 200) is currently pointing. In another implementation as discussed above in connection with FIG. 7, velocity 760 of device 200 may cause first focal point 710 on map 700 to shift to the bottom of map 700 so that map 700 may display a current location of the user (e.g., first focal point 710) and map details or features extending from the current location to the horizon in the direction of velocity 760 of device 200. In still another implementation as discussed above in connection with FIG. 7, second focal point 720 (e.g., destination) may be inputted by a user of device 200 and may appear at the top of map 700. In another implementation, a user of device 200 could move the focal point around using control buttons 240 and/or keys of keypad 250 of device 200.

If the focal point is not to be adjusted (block 830—NO) or if the focal has been adjusted (block 840), then a map may be displayed based on the location information and/or the focal point (block 850). For example, in one implementation as discussed above in connection with FIG. 1, the features of map 100 may be based on location information (e.g., the position, orientation, velocity, etc. of device 200) and/or focal point 110.

A focal point (e.g., the adjusted or unadjusted focal point, and/or multiple focal points) may be displayed on the map (block 860). For example, in one implementation as discussed above in connection with FIG. 7, first focal point 710 (e.g., indicating the location of device 200), and second focal point 720 (e.g., indicating a user inputted destination to be reached) may be displayed on map 700. Focal points 710 and 720 may be generated automatically, as discussed above in connection with FIGS. 1 and 4, and/or manually by a user. Focal points 710 and 720 may be adjusted based on device 200 orientation, as indicated by compass 740, or based on the direction of velocity 760 of device 200, as discussed above in connection with FIGS. 5 and 7.

The details and/or scale of the map may be adjusted based on the focal point (block 870). In one exemplary implementation as shown in FIG. 9, the details of the map (e.g., landmarks, roads, points of interest, features, etc.) may be filtered or decreased on the map as the radial distance from the focal point increases (block 910). For example, in one implementation discussed above in connection with FIG. 6, region 630 closer to focal point 610 may show smaller streets and several points of interest 650 (e.g., landmarks, structures, parks, etc.), whereas region 640 further from focal point 610 may show only larger roads (e.g., interstate highways) and may filter points of interest 650 (e.g., only one point of interest 650 is shown in region 640).

The scale of the map may decrease as the radial distance from the focal point increases (block 920). For example, in one implementation as discussed above in connection with FIG. 4, the scale of map 400 may decrease moving along concentric circles 420-1, 420-2, . . . , 420-N of map 400. The scale of map 400 may be the largest at concentric circle 420-1, and may be the smallest at concentric circle 420-N.

An indicator of direction to points of interest outside the viewing area of the map may be displayed on the map (block 930). For example, in one implementation as discussed above in connection with FIG. 7, a visual feature on map 700 (e.g., an arrow 750) may indicate the direction to a point of interest (e.g., "Harrity Snyder") outside the viewing area of map 700.

CONCLUSION

Systems and methods consistent with the principles of the invention may, based on location information, display a map having variable details and/or scales on a device. Such an arrangement may display a map that may provide a large amount of detail of the immediate surroundings of the device and may provide a context of the surroundings (but not as many details) further away from the device.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 8 and 9, the order of the acts may be modified in other implementations consistent with the principles of the invention. Further, non-dependent acts may be performed in parallel.

It should be emphasized that the term "comprises/comprising" when used in the this specification is taken to specify the presence of stated features, integers, steps or components but does not preclude the presence or addition of one or more other features, integers, steps, components or groups thereof.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
   obtaining location information associated with a device;
   determining a focal point for a map, displayed by a display associated with the device, based on the location information;
   displaying, via the display, the focal point on the map;
   decreasing, via a processor associated with the device, a detail or a scale on the map as a radial distance from the focal point increases;
   determining a field of view for the map based on a velocity of the device;
   adjusting, via the processor, the focal point to a point on the map based on the velocity; and
   adjusting, via the processor, the field of view for the map based on the velocity and the adjusted focal point.

2. The method of claim 1, further comprising:
   displaying, via the display, the focal point at a center of the map.

3. The method of claim 1, further comprising:
   adjusting, via the processor, the focal point to a location on the map other than a center of the map.

4. The method of claim 3, further comprising:
   adjusting, via the processor, the focal point to a point on the map further based on an orientation of the device.

5. The method of claim 3, further comprising:
   adjusting, via the processor, the focal point to a point on the map further based on a user inputted location.

6. The method of claim 1, where decreasing the detail or the scale comprises one of:
   decreasing the detail or the scale on the map continuously as the radial distance from the focal point increases;
   decreasing the detail or the scale on the map in discrete steps as the radial distance from the focal point increases;
   decreasing the detail or the scale on the map logarithmically as the radial distance from the focal point increases; or
   decreasing the detail or the scale on the map exponentially as the radial distance from the focal point increases.

7. The method of claim 1, further comprising:
   displaying, via the display, a direction to a point of interest outside a viewing area of the map.

8. The method of claim 1, further comprising:
   determining the focal point for the map based on a location of the device as determined through a global position system (GPS).

9. The method of claim 8, further comprising:
   determining the field of view for the map further based on an orientation of the device.

10. The method of claim 1, further comprising:
    determining the field of view for the map further based on an orientation of the device.

11. The method of claim 1, further comprising:
    determining the focal point for the map further based on user input.

12. The method of claim 1, further comprising:
    adjusting, via the processor, a feature of the map based on a user controlled map scaling.

13. A device comprising:
    means for obtaining location information associated with the device;
    means for determining a focal point for a map based on the location information;
    means for displaying the map;
    means for displaying the focal point on the map;
    means for decreasing a detail or a scale on the map as a radial distance from the focal point increases;
    means for determining a field of view for the map based on a velocity of the device;
    means for adjusting the focal point to a point on the map based on the velocity; and
    means for adjusting the field of view for the map based on the velocity and the adjusted focal point.

14. The device of claim 13, further comprising:
    means for displaying the focal point at a center of the map.

15. The device of claim 13, further comprising:
    means for displaying the focal point at a location on the map other than a center of the map.

16. A device comprising:
    a location information gatherer to obtain location information associated with the device; and
    a processor to:
      determine a focal point for a map based on the location information,
      display the map,
      display the focal point on the map,
      decrease a detail or a scale on the map as a radial distance from the focal point increases,
      determine a field of view for the map based on a velocity of the device,
      adjust the focal point to a point on the map based on the velocity, and
      adjust the field of view for the map based on the velocity and the adjusted focal point.

17. The device of claim 16, where the location information gatherer includes at least one of:
    a global positioning system (GPS) unit to determine a location or a velocity of the device,
    a compass to determine an orientation of the device, or
    a Doppler unit to determine the velocity of the device.

18. The device of claim 17, where, when determining the focal point for the map, the processor is configured to determine the focal point based on the location received from the GPS unit.

19. The device of claim 17, where, when determining the focal point for the map, the processor is configured to determine the field of view for the map based on the orientation received from the compass.

20. The device of claim 17, where, when determining the focal point for the map, the processor is configured to determine the field of view for the map based on the velocity received from one of the GPS unit or the Doppler unit.

21. The device of claim 17, where, when displaying the focal point on the map, the processor is configured to adjust the focal point to a point on the map further based on the orientation received from the compass.

22. The device of claim 17, where, when displaying the focal point on the map, the processor is configured to adjust the focal point to a point on the map based on the velocity received from the Doppler unit.

23. The device of claim 17, where, when displaying the focal point on the map, the processor is configured to adjust the focal point to a point on the map further based on a user inputted location.

24. The device of claim 16, where, when determining the focal point for the map, the processor is configured to determine the focal point further based on a user inputted location.

25. The device of claim 16, where, when displaying the focal point on the map, the processor is configured to display the focal point at a center of the map.

26. The device of claim 16, where, when displaying the focal point on the map, the processor is configured to display the focal point at a location on the map other than a center of the map.

27. The device of claim 16, where, when decreasing the detail or the scale on the map, the processor is configured to one of continuously, discretely, logarithmically, or exponentially decrease the detail or the scale on the map as the radial distance from the focal point increases.

28. A device comprising:
a memory to store instructions; and
a processor to execute the instructions to:
obtain location information associated with the device,
determine a focal point for a map based on the location information,
display the map,
display the focal point on the map,
decrease a detail or a scale on the map as a radial distance from the focal point increases,
determine a field of view for the map based on a velocity of the device,
adjust the focal point to a point on the map based on the velocity, and
adjust the field of view for the map based on the velocity and the adjusted focal point.

* * * * *